(12) United States Patent
Neelakantan et al.

(10) Patent No.: US 11,475,890 B2
(45) Date of Patent: Oct. 18, 2022

(54) GENERATING AUTOMATED ASSISTANT RESPONSES AND/OR ACTIONS DIRECTLY FROM DIALOG HISTORY AND RESOURCES

(71) Applicant: Google LLC, Mountain View, CA (US)

(72) Inventors: Arvind Neelakantan, Mountain View, CA (US); Daniel Duckworth, Salinas, CA (US); Ben Goodrich, Mountain View, CA (US); Vishaal Prasad, Mountain View, CA (US); Chinnadhurai Sankar, Montreal (CA); Semih Yavuz, Santa Barbara, CA (US)

(73) Assignee: GOOGLE LLC, Mountain View, CA (US)

( * ) Notice: Subject to any disclaimer, the term of this patent is extended or adjusted under 35 U.S.C. 154(b) by 197 days.

(21) Appl. No.: 16/910,435

(22) Filed: Jun. 24, 2020

(65) Prior Publication Data
US 2020/0402507 A1    Dec. 24, 2020

Related U.S. Application Data

(60) Provisional application No. 62/865,740, filed on Jun. 24, 2019.

(51) Int. Cl.
*G10L 15/22* (2006.01)
*G06N 5/04* (2006.01)

(52) U.S. Cl.
CPC .............. *G10L 15/22* (2013.01); *G06N 5/04* (2013.01); *G10L 2015/225* (2013.01)

(58) Field of Classification Search
CPC ............... G10L 15/22; G10L 2015/225; G10L 2015/223; G10L 15/1822; G10L 15/063; G10L 15/16; G10L 2015/0638; G06N 5/04; G06N 3/0454; G06N 3/0472; G06N 3/08; G06F 16/3329; G06F 9/453; G06F 40/126; G06F 40/216; G06F 40/279
See application file for complete search history.

(56) References Cited

U.S. PATENT DOCUMENTS

| 10,540,967 B2 * | 1/2020 | Perez ....................... G06F 40/35 |
| 2019/0115027 A1 * | 4/2019 | Shah ....................... G10L 17/22 |

OTHER PUBLICATIONS

Bordes, A. et al.; Learning End-to-End Goal-Oriented Dialog; Facebook AI Research; ICLR; pp. 1-15; US; dated 2017.
(Continued)

*Primary Examiner* — Abul K Azad
(74) *Attorney, Agent, or Firm* — Middleton Reutlinger

(57) ABSTRACT

Training and/or utilizing a single neural network model to generate, at each of a plurality of assistant turns of a dialog session between a user and an automated assistant, a corresponding automated assistant natural language response and/or a corresponding automated assistant action. For example, at a given assistant turn of a dialog session, both a corresponding natural language response and a corresponding action can be generated jointly and based directly on output generated using the single neural network model. The corresponding response and/or corresponding action can be generated based on processing, using the neural network model, dialog history and a plurality of discrete resources. For example, the neural network model can be used to generate a response and/or action on a token-by-token basis.

20 Claims, 7 Drawing Sheets

(56) References Cited

OTHER PUBLICATIONS

Henderson et al.; Deep Neural Network Approach for the Dialog State Tracking Challenge; Proceedings; pp. 467-471; dated 2013.

LeCun et al. "Deep learning." Nature 521, No. 7553 (2015): 436-444; 2015.

Mintz, M., et al.; Distant Supervision for Relation Extraction without Labeled Data; ACL; vol. 2; 9 Pages; Jan. 1, 2009.

Vaswani, A. et al. "Attention is All You Need"; In Advances in Neural Information Processing Systems; 2017; 11 pages; 2017.

Vinyals et al. "A Neural Conversational Model." arXiv preprint arXiv:1506.05869 (2015); 8 pages; Jun. 19, 2015.

Budzianowski, P. et al., "MultiWOZ—A Large-Scale Multi-Domain Wizard-Of-Oz Dataset For Task-Oriented Dialogue Modelling;" Proceedings of the Empirical Methods in Natural Language Processing; pp. 5016-5026; Oct. 2018.

Eric, M. et al., "A Copy-Augmented Sequence-To-Sequence Architecture Gives Good Performance On Task-Oriented Dialogue;" Proceedings of the 15th Conference of the European Chapter of the Association for Computational Linguistics (EACL); vol. 2; pp. 468-473; Apr. 2017.

Seo, M. et al., "Query-Reduction Networks For Question Answering;" Cornell University; arXiv.org; arXiv:1606.04582v6; ICLR 2017; 13 pages; Feb. 24, 2017.

Levin, E. et al., "A Stochastic Model Of Human-Machine Interaction For Learning Dialogue Strategies;" IEEE Transactions on Speech and Audio Processing; vol. 8, Issue 1; 13 pages; Jan. 2000.

Lewis, M. et al., "Deal or No Deal? End-to-End Learning for Negotiation Dialogues;" Proceedings of the 2017 Conference on Empirical Methods in Natural Language Processing (EMNLP); pp. 2433-2443; Sep. 2017.

Li, J. et al., "A Diversity-Promoting Objective Function for Neural Conversation Models;" Proceedings of NAACL-HLT 2016; pp. 110-119; Jun. 2016.

Mrksic, N. et al., "Neural Belief Tracker: Data-Driven Dialogue State Tracking;" Proceedings of the 55th Annual Meeting of the Association for Computational Linguistics; pp. 1777-1788; 2017.

Liu, F. et al.; "Gated End-To-End Memory Networks;" Proceedings of the 15th Conference of the European Chapter of the Association for Computational Linguistics; vol. 1; pp. 1-10; Apr. 2017.

Rastogi, A. et al., "Scalable Multi-Domain Dialogue State Tracking;" Proceedings of IEEE ASRU; 8 pages; 2017.

Wen, T-H. et al., "A Network-based End-to-End Trainable Task-oriented Dialogue System;" Proceedings of the 15th Conference of the European Chapter of the Association for Computational Linguistics; vol. 1; pp. 438-449; Apr. 2017.

Serban, I. et al., "A Hierarchical Latent Variable Encoder-Decoder Model For Generating Dialogues;" Proceedings of the 31st AAAI Conference on Artificial Intelligence; 7 pages; 2017.

Singh, S. et al., "Optimizing Dialogue Management with Reinforcement Learning: Experiments with the NJFun System;" Journal of Artificial Intelligence Research 16; pp. 105-133; 2002.

Sukhbaatar, S. et al., "End-To-End Memory Networks;" 29th Annual Conference on Neural Information Processing Systems (NeurIPS); 11 pages; 2015.

Vaswani, A. et al., "Tensor2Tensor for Neural Machine Translation;" arXiv.org; arXiv:1803.07416v1; 9 pages; Mar. 16, 2018.

Weizenbaum, J. "ELIZA: A Computer Program For the Study of Natural Language Communication Between Man and Machine;" Computational Linguistics; Communications of the ACM; vol. 9, No. 1; pp. 36-45; Jan. 1966.

Wen, T-H. et al., "Semantically Conditioned LSTM-based Natural Language Generation for Spoken Dialogue Systems;" Proceedings of the 2015 Conference on Empirical Methods in Natural Language Processing; (EMNLP) pp. 1711-1721; Sep. 2015.

Wen, T-H. et al., "Latent Intention Dialogue Models;" Proceedings of International Conference on Machine Learning (ICML); 10 pages; 2017.

Weston, J. et al., "Memory Networks;" ICLR; 15 pages; 2015.

Williams, J. et al., "Hybrid Code Networks: practical and efficient end-to-end dialog control with supervised and reinforcement learning;" Proceedings of the 55th Annual Meeting of the Association for Computational Linguistics (ACL); pp. 665-677; 2017.

Williams, R. et al. "A Learning Algorithm for Continually Running Fully Recurrent Neural Networks;" Neural Computation; vol. 1; 10 pages; 1989.

Wu, C-S. et al., "Global-To-Local Memory Pointer Networks For Task-Oriented Dialogue;" Proceedings of 7th International Conference on Learning Representations (ICLR); 9 pages; 2019.

Zhang, S. et al., "Personalizing Dialogue Agents: I have a dog, do you have pets too?" Proceedings of the 56th Annual Meeting of the Association for Computational Linguistics (ACL); pp. 2204-2213; Jul. 2018.

\* cited by examiner

GENERATING AUTOMATED ASSISTANT RESPONSES AND/OR ACTIONS DIRECTLY FROM DIALOG HISTORY AND RESOURCES

BACKGROUND

Humans can engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output and/or taking a responsive action. A responsive user interface output can include natural language output, which can optionally be converted to synthesized speech and rendered. A responsive action can include, for example, controlling a peripheral device (e.g., a smart light, a smart appliance, etc.) and/or interacting with another system to perform task(s) (e.g., requesting a ride-share vehicle, making a restaurant reservation, etc.).

Automated assistants typically rely upon a pipeline of multiple discrete components in interpreting and responding to user requests. For example, a natural language understanding component can be used to process text of a request (e.g., text converted from a spoken utterance) to generate a symbolic representation, or belief state, that is a semantic representation of the text. For example, the belief state could include intent(s) that correspond to the text and optionally parameter(s) (e.g., slot values) for the intent(s). A separate fulfillment component can then utilize the belief state to reason on external knowledge source(s) whose result(s) are utilized, independently, in an action prediction task and a response generation task. However, relying on a pipeline of components can make automated assistants difficult to scale. Moreover, each individual component must be trained individually, which can require significant engineering effort and significant utilization of computer resources during training. Further, global reinforcement signals (i.e., those that depend on the overall outcome of a dialog turn or full dialog) can be problematic and/or impossible to effectively apply in training individual components.

SUMMARY

Implementations disclosed herein are directed to training and/or utilizing a single neural network model to generate, at each of a plurality of assistant turns of a dialog session between a user and an automated assistant, a corresponding automated assistant natural language response and/or a corresponding automated assistant action. For example, at a given assistant turn of a dialog session, both a corresponding natural language response and a corresponding action can be generated jointly, and can be generated based directly on output generated using the single neural network model.

The corresponding response and/or corresponding action can be generated based on processing, using the neural network model, of dialog history (i.e., user utterance(s), prior automated assistant response(s), and/or prior automated assistant action(s)) and a plurality of discrete resources (e.g., knowledge graph entries, search results, and/or search result documents). For example, the neural network model can be used to generate a response and/or an action on a token-by-token basis, where each token is a word, a word piece, or a character. For instance, at each of a plurality of iterations, a corresponding probability distribution over a vocabulary of tokens can be generated using the neural network model, and the token with the highest probability selected at that iteration. Accordingly, over a plurality of iterations (e.g., until an "end" token has the highest probability) a sequence of highest probability tokens are selected and that sequence is the natural language response and/or the action. The natural language response can be rendered (e.g., as audible output based on text-to-speech processing) as an automated assistant response and any action can be initiated by the automated assistant (e.g., transmitted to remote device(s) to cause performance of the action).

In these and other manners, automated assistant responses and actions are generated without requiring generation of a belief sate utilizing a separate natural language component, and subsequent utilization of a separate fulfillment component. Through training and utilization of a single neural network model according to implementations disclosed herein, automated assistant response and action generation can be performed across a variety of domains and for a variety of dialogs, enabling efficient scaling of automated assistant functionality across domains and/or dialogs. Further, global reinforcement signals can be utilized to effectively train the single neural network model, mitigating the need for resource and labor intensive annotation of belief states in training a separate natural language component and/or a separate fulfillment component.

In some implementations, the single neural network model includes a transformer encoder and a transformer decoder. In some versions of those implementations, the transformer encoder is utilized to process a concatenation of the dialog history and a concatenation of the discrete resources to generate an encoded representation that encompasses an encoded dialog representation (of the dialog history) and an encoded resource representation (of the discrete resources). In some other versions of those implementations, the transformer encoder is utilized to process the dialog history to generate an encoded dialog representation, and the encoded resource representation is based on separate processing of the discrete resources. The separate processing can include, for example, generating an average word embedding and/or other initial representation of each of the discrete resources. The separate processing can additionally or alternatively include attention fusion where initial representations of the discrete resources are modified based on (e.g., multiplied by) corresponding probabilities of the discrete resources that are determined using a sparse attention mechanism and the encoded dialog representation. As described herein, utilization of the sparse attention mechanism can, when utilized in various implementations, result in efficient natural language response and/or action prediction utilizing a single neural network model. For example, the sparse attention mechanism can enable efficient run-time consideration of a large quantity (e.g., thousands) of disparate resources in natural language response and/or action prediction. Additionally or alternatively, utilization of the sparse attention mechanism can mitigate overfitting issues that would otherwise arise due to a limited quantity of training instances and/or a proliferation of rare tokens in utilized discrete resources.

In various implementations, the transformer decoder is used to generate the natural language response and/or the action, token-by-token, through attending of the transformer decoder's attention heads to both the encoded dialog representation and the encoded resource representation. In some of those various implementations, attending to both the encoded dialog representation and the encoded resource representation can enable use of the decoder in efficient response and/or action generation that takes into account both dialog history and relevant (as indicated by the encoded resource representation attention) discrete resources. As one example, at a first iteration a "start" token can be processed using the transformer decoder attended to both representations, to generate a first probability distribution over a vocabulary of tokens. The highest probability token can be selected as the first token of the natural language response and/or the action. The start token and the highest probability token can then be processed using the transformer decoder attended to both representations, to generate a second probability distribution over the vocabulary of tokens. The highest probability token can be selected as the second token of the natural language response and/or the action. This process can continue, selecting a new token at each iteration and adding it to the input processing of the next iteration, until an "end" token is selected. The resulting sequence of tokens can then be utilized as the natural language response and/or the action performed by the automated assistant.

Some implementations disclosed herein are directed to training the transformer encoder, the transformer decoder, and optionally the sparse attention mechanism (when utilize) of the single neural network model utilized in natural language response and/or action generation. Training instances can be utilized that each include a ground truth existing dialog history (i.e., user utterance(s), automated assistant response(s), and/or automated assistant action(s)) and a ground truth next automated assistant response and/or automated assistant action.

In some of those implementations and during at least part of the training, only a subset of available discrete resources are processed with a training instance (whereas all available discrete resources can optionally be processed at run time). For example, a positive subset of the discrete resources can be selected for a training instance based on term(s) of the discrete resources matching (soft and/or exact matching) term(s) for a ground truth next automated response and/or action for that training instance. Additionally, to increase training speed (through inclusion of weakly labeled negative discrete resources), a negative subset of the remaining discrete resources can be randomly selected for the training instance. Collectively, the positive subset and the negative subset still form a subset of the available discrete resources. For example, they can form less than 50%, less than 10%, or less than 5% of the available discrete resources. Consideration of only a subset of discrete resources at each iteration can also increase training speed, and selecting the positive subset through distant supervision can enable effective training, while selecting the negative subset further increases the training speed. Also, and as described herein, utilization of the weak supervision signal from distant supervision can guide training of the sparse attention mechanism in implementations where the sparse attention mechanism is utilized.

In some implementations where the sparse attention mechanism is trained, it may not be trained at all for the first M steps (e.g., 10,000; 20,000, or other number) of training and/or the first M duration of training (e.g., 10 hours, 15 hours, or other duration). For example, during those steps the transformer encoder and/or transformer decoder weights can be updated, without updating weights for the sparse attention mechanism. For the first M steps and/or M duration, the positively labeled electronic resources, determined from the weak labeling based on distant supervision, can be utilized as the electronic resources and the decoder attended to representations of those electronic resources. These first M training steps warm-start the model and train other parts of the model excepting attention. Optionally, during the first M training steps and/or during the M duration, the negatively labeled electronic resources, determined from the weak labeling based on distant supervision, are not utilized. For the next N (e.g., 20,000 or other quantity) steps and/or N duration, the sparse attention mechanism is trained. The sparse attention mechanism can be trained based on the weak supervision signal (e.g., comparing the probabilities predicted using the sparse attention mechanism to the weak labeling based on distant supervision) and/or based on the response and action predicted by the decoder to the ground truth response and action. Further, for the next N steps and/or N duration, the sparse attention on the KB interpolates between distant supervision, and probabilities (e.g., sigmoid probabilities) generated using the sparse attention mechanism from the model. For example, in determining the electronic resource based attention for the decoder, for a positively labeled electronic resource it can be based on an interpolation between the sparse sigmoid probability for that resource and a positive (e.g., "1") probability for the electronic resource inferred from the distant supervision. In some implementations, the weight on the distant supervision is gradually decayed (e.g., from 1.0 to 0.0) over the N steps. This enables the sparse attention mechanism to be trained over the N steps, while guiding the electronic resource based attention for the decoder during training of the sparse attention mechanism (while decreasing the degree of guiding as the sparse attention mechanism is further trained). For the last O (e.g., 10,000 or other quantity) steps and/or O duration, the sparse attention mechanism continues to be trained. However, only the sparse attention mechanism is used in determining the electronic resource based attention for the decoder during the last O steps, without considering the distant supervision (or with only de minimis use of the distant supervision).

The above is provided as an overview of only some implementations disclosed herein. These and other implementations are described in additional detail below.

Various implementations disclosed herein can include a transitory or non-transitory computer readable storage medium storing instructions executable by one or more processors (e.g., one or more central processing units (CPUs), one or more graphics processing units (GPUs), and/or one or more tensor processing units (TPUs)) to perform a method such as one or more of the methods described herein. Yet other implementation can include a system of one or more computers that include one or more processors operable to execute stored instructions to perform a method such as one or more of the methods described herein.

DETAILED DESCRIPTION

Figure 1:
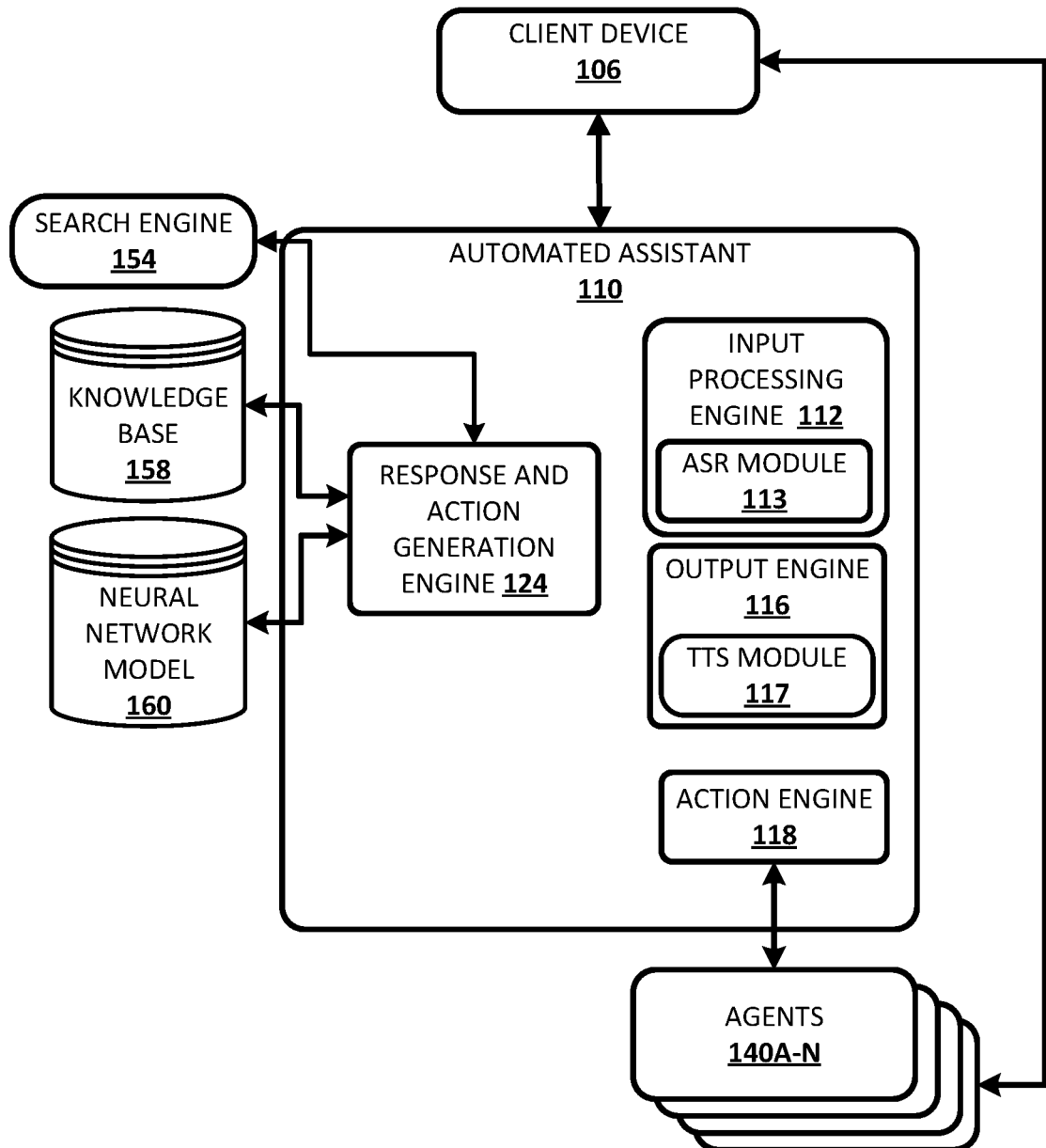
FIG. 1 is a block diagram of an example environment in which implementations disclosed herein may be implemented.

Prior to describing the figures, some particular examples of various implementations are described. Implementations disclosed herein present a single neural network model that is used to process, as input, conversation history and an external knowledge source (that includes a plurality of discrete resources such as knowledge triples), and jointly generate, as output, both a text response and an action (if any) to be taken by the system as output. The action can also be represented in text/token form. For example, a smart thermostat temperature decrease adjustment action can be of the form "adjust(action=decrease, amount=2)", where "adjust" defines an intent of the action, "decrease" defines a value for an increase/decrease parameter, and "2" defines a value for a number of degrees for the adjustment. As another example, a hotel booking action can be of the form "hotel-book (nights=2,people=4,day=Friday)", where "hotel-book" defines an intent of the action, "2" defines a value for a number of nights parameter, "4" defines a value for a number of people parameter, and "Friday" defines a value for a check-in date parameter.

Through training according to implementations disclosed herein, the neural network model effectively learns to reason on the provided knowledge source with a weak supervision signal coming from the text generation and the action prediction tasks, thereby removing the need for belief state annotations. Various different strategies can optionally be utilized for efficient utilization of external knowledge source(s) with the neural network model. For example, distant supervision can be utilized as an additional source of a (weak) supervision signal to help the model train to enable selection of (and/or attending to) relevant discrete resources from a large knowledge source. For instance, distant supervision can be performed by making the model discriminate between weakly labelled positive examples and randomly (e.g., pseudo-random or truly random) sampled negative examples. As another example, a sparse attention mechanism on the external knowledge source can additionally or alternatively be utilized to prevent overfitting to the training instances. As yet another example, the output of the generative model (e.g., a probability distribution) can additionally or alternatively be modified to enable provision of an option to copy token(s) from the dialog history and/or or discrete resource(s) instead of always generating. This is motivated by the recognition that desired output tokens can contain entries from the knowledge source which are generally rare tokens and could be hard for the model to directly predict, absent the modification. As yet another example, in various implementations (e.g., where the neural network model is utilized to produce both a text response and an action), scheduled sampling can be utilized during training in lieu of (or as a compliment to) teacher-forced training.

In some implementations, a data set that contains actual and/or hand-engineered multi-turn dialogs between users and automated assistants can be utilized in generating training instances for training the neural network model. One non-limiting example is the MultiWOZ dataset, which contains 10,000 multi-turn dialogs between users and wizards. Along with conversations, the dataset contains both belief state and dialog act (or semantic parse) annotations. Only belief state annotations that correspond to action prediction are utilized (in generating ground truth automated assistant actions), and other belief states are removed from the dataset. Dialog act annotations are not utilized.

The task-oriented dialog problem can be formulated as taking conversation history along with a relevant knowledge source/knowledge base (KB) as input, and generating system action and the assistant's next turn text response as output. For example, the conversation history could contain a single turn of a user utterance "find me an inexpensive Italian restaurant in San Francisco", and one of the possible assistant's next turn responses could be "how about The Great Italian?". Here, the external knowledge required to generate the output would be present in the provided KB. A common way to store such facts is in triple format. For example, in this case the KB could contain triples such as (The Great Italian, type, restaurant), (The Great Italian, cuisine, Italian), (The Great Italian, price, cheap) and so on. Given the above two utterances, the user might say "sounds good, can you book a table for 4 at 7 pm?", for which the assistant performs a system action book_table(name=The Great Italian, num_seats=4, time=7 pm), and generates a text response "Done!".

Implementations disclosed herein enable directly mapping the conversation/dialog history and KB to next turn system action, and text response, without any intermediate symbolic states and without intermediate supervision signals.

The dialog/conversation history, as used herein, includes user utterance(s) and/or system utterance(s), and is updated following each turn of a user-automated assistant dialog to reflect that most recent turn's contribution to the dialog history. More formally, let $((u^1, a^1), (u^2, a^2), \ldots, (u^U, a^U))$ denote conversation history containing U turns each of user utterance ($u^i$) and assistant utterance ($a^i$). The user and assistant turns each contain variable number of word tokens.

The knowledge base/knowledge source, as used herein, includes a collection of discrete structured and/or unstructured resources. For example, the knowledge base can include a knowledge graph that includes triples (or other representations), each of which defines a pair of entities and a relationship between the pair of entities. Also, for example, the knowledge base can additionally or alternatively include all or portions (e.g., titles, snippets, first sentence(s)) of unstructured web-based documents, unstructured search results, and/or other resource(s). In various implementations, the knowledge base that is considered at run-time can be static across multiple (e.g., all) dialog sessions and/or dialog turns. In other implementations, the knowledge base that is considered in a given turn can be determined dynamically based on all or parts of conversation history to that point (e.g., at least the most recent user utterance). For example, at a given turn a search can be issued to identify one or more discrete resources that are responsive to the search, and the knowledge base for the given turn can be based on one or more (e.g., the top 10 or other quantity) of the identified discrete resources. For instance, the discrete resources can each be all or part of a corresponding responsive search result, part of a corresponding responsive search result document, or a corresponding responsive knowledge graph entry (e.g., a triple).

For the implementations where the knowledge base is in the form of structured KB containing a list of triples, it can be formally represented as K=($e_1^1$, $r_1$, $e_1^2$), . . . , ($e_M^1$, $r_K$, $e_M^2$), where e represents an entity, and, r represents a relationship. The entities and/or relationships can be represented by, or otherwise associated with, corresponding text (i.e., alias(es) of the entity).

Where the neural network model includes a decoder (e.g., transformer decoder), it can be used to generate both the action and text response one token at a time left-to-right. The system action can also be in text format, and a concatenated version of system action and text response can be generated as one long sequence. More formally, let y=($y_1$, $y_2$, . . . , $y_T$) denote the target sequence. The target sequence distribution can be modeled as:

$$P_{gen}(y|x, K) = \Pi_{t=1}^T P\theta(y_t|y_{1:t-1}, x, K) \quad (1)$$

Some implementations disclosed herein can utilize a transformer sequence-to-sequence model that is used to process a concatenation of both conversation history and KB. The transformer decoder is used to generate system action and text response for the assistant's next turn. Given a training set of N examples (($x^1$, $K^1$, $y^1$), ($x^2$, $K^2$, $y^2$), . . . , ($x^N$, $K^N$, $y^N$)), the objective function to be maximized is given by $$\mathcal{L}_{gen}(\theta) = \Sigma_{i=1}^N \Sigma_{t=1}^{T_i} \log p_\theta(y_t^i | y_{1:t-1}^i, x^i, K^i) \quad (2)$$

Although the transformer sequence-to-sequence model with the preceding objective function can be effectively utilized in various implementations, other implementations disclosed herein utilize alternative approaches. The alternative approaches can reduce the amount of time and/or computational resources during training, can mitigate overfitting issues during training, and/or mitigate the inclusion of relatively rare tokens in the knowledge base.

Some of those alternative approaches are now described. Some implementations use the transformer encoder to process the conversation history, without processing of the knowledge base utilizing the transformer encoder. More formally, let x=($x_1$, $x_2$, . . . , $x_p$) be the concatenated conversation history (e.g., both assistant and user turns separated by delimiters) containing P tokens. Through processing the conversation history using the transformer encoder, P hidden states $h_1$, $h_2$, . . . , $h_p$ can be generated after word embedding lookup and multiple self-attention layers of the transformer encoder. Each of the discrete resources in the knowledge base can be represented based on generated word embeddings for token(s) of the discrete resource. For example, a KB triple can be represented as an average of the word embeddings of the tokenized triple. More formally, for KB triples K=($e_1^1$, $r_1$, $e_1^2$), ($e_2^1$, $r_2$, $e_2^2$), . . . , ($e_M^1$, $r_K$, $e_M^2$), they can be represented as $v_1$, $v_2$, . . . , $v_M$.

The transformer decoder can continue to be used, and can include both self-attention and encoder-decoder attention layers. In various implementations, overfitting and/or other issues are mitigated by employing a sparse attention mechanism over the KB. For example, the average of the encoder hidden states, $$h = \frac{1}{P}\sum_{i=1}^P h_i$$

can be utilized to compute sigmoid probability for every fact $q_i = \sigma(h \cdot v_i) \forall i \in 1, 2, \ldots, M$. Further, $q_i$ can be set to zero if it is less than a threshold, which restricts the number of electronic resources that can be used by the model to fit the given training example. Sigmoid attention can optionally be utilized instead of regular softmax attention, as sigmoid attention makes it easier to choose more than one electronic resource.

The transformer decoder can be modified to attend to both the encoder hidden states of the conversation history, and to the representation of the fact triples. In other words, the decoder attention heads attend to the set [$h_1$, . . . , $h_P$, $v_1$, . . . , $v_M$], and not just to [$h_1$, . . . , $h_P$]. Attention fusion can be performed when applying decoder attention, by modifying initial representations of the discrete resources based on the sparse attention probabilities. For example, the logits on fact triples can be modified by multiplying the logits with the sparse sigmoid attention probabilities.

As mentioned above, distant supervision can optionally be utilized where, at training time, discrete resources are labeled as positive if term(s) in the discrete resource match term(s) in the ground-truth response and/or action. For example, triples can be labeled as positive if some word in the entities of the triple ($e^1$, $e^2$ in ($e^1$, r, $e^2$)) are present in the ground-truth response and/or action. This weak supervision signal can potentially guide the sparse attention mechanism described above. Additionally, to increase training speed, negative sampling can be utilized where, among all the (weakly) labeled negative samples (i.e., those not labeled as positive) a small amount of them can be sampled and added as input. At run time, since a ground-truth response and/or action is not available, the model can optionally be utilized to process the whole KB as input.

The distant supervision objective to be maximized can be formally represented by:

$$\mathcal{L}_d(\theta) = \sum_{i=1}^N \sum_{m=1}^{M_i} (\log q_m [[y_m == 1]] + \log(1 - q_m)[[y_m == 0]]) \quad (3)$$

where $q_m$ is the sparse sigmoid attention probability, and $y_m$ is an indicator variable that is set to 1 if some word in the entities of the triple are present in the ground-truth target sequence and 0 otherwise.

The model can be trained by maximizing an interpolation of the two objective functions in Equation (2) and Equation (3), given by:

$$\mathcal{L}_{final}(\theta) = \alpha \mathcal{L}_{gen}(\theta) + (1-\alpha)\mathcal{L}_d(\theta) \quad (4)$$

The processing using the transformer decoder can generate a corresponding probability distribution over the entire vocabulary at every time step. In task-oriented dialog, many of the tokens in the text response, like entity names, are taken from the KB. Since these entities occur infrequently it might be hard for the model to assign high probability to such rare words. In view of these considerations, implementations can augment the decoder by allowing it to copy from input or generate from vocabulary at every time step. The probability to generate a word from vocabulary is computed as before. The probability to copy is computed by averaging the multi-head decoder attention distributions on the input (conversation history+KB). The final probability for generating a word is obtained as a weighted mixture of generating and copying that word. To obtain this weight, at every step in decoding, the model computes a sigmoid probability for generating the token at that time step from vocabulary.

The output sequence containing both action and text response is usually quite long. In such cases, teacher-forced training might lead to poor performance. In teacher-forcing, training is conditioned on ground-truth history which at test time is replaced by model prediction. If a model commits an error in the beginning of decoding the output sequence, it might make the model condition on history never seen during training. Scheduled sampling aims to mitigate the train and test time discrepancy by making the model condition on its own prediction during training.

In various implementations, to combat difficulties in training the sparse attention mechanism, for the first M (e.g., 20,000 or other quantity) steps of model training the sparse attention mechanism may not be trained. For example, during those steps the transformer encoder and/or transformer decoder weights can be updated, without updating weights for the sparse attention mechanism. For the first M steps, the positively labeled electronic resources, from distant supervision, can be utilized as the electronic resources and the decoder attended to those electronic resources. These first M training steps warm-start the model and train other parts of the model excepting attention. For the next N (e.g., 20,000 or other quantity) steps, the sparse attention mechanism is trained. Further, the sparse attention on the KB interpolates between distant supervision, and sparse sigmoid probabilities generated using the sparse attention mechanism from the model. For example, in determining the electronic resource based attention for the decoder, for a positively labeled electronic resource it can be based on an interpolation between the sparse sigmoid probability for that resource and a positive (e.g., "1") probability for the electronic resource inferred from the distant supervision. In some implementations, the weight on the distant supervision is gradually decayed (e.g., from 1.0 to 0.0) over the N steps. This enables gradually increasing of the training impact attributable to the sparse attention mechanism's errors. For the last O (e.g., 10,000 or other quantity) steps the sparse attention mechanism continues to be trained. However, only the sparse attention mechanism is used, without considering the distant supervision (or with de minimis use of the distant supervision).

Turning now to the figures, these and other implementations are described in more detail.

FIG. 1 illustrates an example environment in which techniques disclosed herein can be implemented. The example environment includes a client device 106, an automated assistant 110, and a plurality of agents 140A-N. The client device 106 may be, for example, a standalone voice-activated speaker device, a desktop computing device, a laptop computing device, a tablet computing device, a mobile phone computing device, a computing device of a vehicle of the user, and/or a wearable apparatus of the user that includes a computing device (e.g., a watch of the user having a computing device, glasses of the user having a computing device, a virtual or augmented reality computing device). Additional and/or alternative client devices may be provided.

Although automated assistant 110 is illustrated in FIG. 1 as separate from the client device 106, in some implementations all or aspects of the automated assistant 110 may be implemented by the client device 106. For example, in some implementations, input processing engine 112 and/or response and action generation engine 124 may be implemented by the client device 106. In implementations where one or more (e.g., all) aspects of automated assistant 110 are implemented by one or more computing devices remote from the client device 106, the client device 106 and those aspects of the automated assistant 110 communicate via one or more networks, such as a wide area network (WAN) (e.g., the Internet).

Although only one client device 106 is illustrated in combination with the automated assistant 110, in many implementations the automated assistant 110 may be remote and may interface with each of a plurality of client devices of the same user and/or with each of a plurality of client devices of multiple users. For example, the automated assistant 110 may manage communications with each of the multiple devices via different sessions and may manage multiple sessions in parallel. For instance, the automated assistant 110 in some implementations may be implemented as a cloud-based service employing a cloud infrastructure, e.g., using a server farm or cluster of high performance computers running software suitable for handling high volumes of requests from multiple users. However, for the sake of simplicity, many examples herein are described with respect to a single client device 106.

The automated assistant 110 is separate from the agents 140A-N and communicates with the agents 140A-N via an API and/or via one or more communications channels (e.g., an internal communications channel of client device 106 and/or a network, such as a WAN). In some implementations, one or more of the agents 140A-N are each managed by a respective party that is separate from a party that manages the automated assistant 110. As used herein, an "agent" references one or more computing devices, smart devices, and/or software that can be utilized by an automated assistant to cause performance of an action generated by the response and action generation engine 124. In some situations, an agent can be separate from the automated assistant 110 and/or may communicate with the automated assistant 110 over one or more communication channels. In some of those situations, the automated assistant may transmit, from a first network node, data (e.g., an agent command) to a second network node that implements all or aspects of the functionality of the agent. In some situations, an agent may be a third-party (3P) agent, in that it is managed by a party that is separate from a party that manages the automated assistant 110. In some other situations, an agent may be a first-party (1P) agent, in that it is managed by the same party that manages the automated assistant 110.

An agent is configured to receive (e.g., over a network and/or via an API) an action command transmitted by the automated assistant 110. In response to receiving an action command, the agent performs a corresponding action and optionally generates responsive content for provision of user interface output that is based on the responsive content. For example, the agent may transmit the responsive content to the automated assistant 110 for provision of output, by the automated assistant 110, that is based on the responsive content. As another example, the agent can itself provide the output. For instance, the user can interact with the automated assistant 110 via the client device 106 (e.g., the automated assistant can be implemented on the client device 106 and/or in network communication with the client device 106), and the agent can be an application installed on the client device 106 or an application executable remote from the client device 106, but "streamable" on the client device 106. When the application is invoked, it can be executed by the client device 106 and/or brought to the forefront by the client device 106 (e.g., its content can take over a display of the client device 106).

As one example, one of the agents 140A-N can be a smart device, or a third-party system that controls a smart device, and the action command can be a command to cause altering a state of the smart device. In response to receiving the action command, the agent can cause the state of the smart device to be altered, and can optionally provide responsive content confirming the alteration of the state. As another example, one of the agents 140A-N can be a ride-sharing booking system, and the action command can be a command to cause a ride-share to be booked. In response to receiving the action command, the agent can cause the ride-share to be booked, and can optionally provide responsive content confirming the booking and/or providing an estimated time of vehicle arrival. As yet another example, one of the agents can be a separate application on the client device 106, and the action command can be a command to cause the separate application to be opened and/or controlled in a particular manner. In response to receiving the action command, the separate application can be opened and/or controlled in accordance with the action command.

The automated assistant 110 includes an input processing engine 112, an output engine 116, an action engine 118, and a response action generation engine 124. Notably, in the implementation of FIG. 1, the automated assistant 110 does not include a natural language understanding component and does not include a fulfillment module, as those modules are obviated in view of the response and action generation engine 124. In some implementations, some of the engines (and/or modules) of automated assistant 110 may be omitted, combined, and/or implemented in a component that is separate from automated assistant 110. Moreover, automated assistant 110 may include additional engines (and/or modules) not illustrated herein for the sake of simplicity.

The automated assistant 110 receives instances of user input from the client device 106. Various types of user input can be provided by a user, via user interface input device(s), to the automated assistant 110. In some instances the input may be a "user utterance" that is free-form natural language input, such as textual input that is based on user interface input generated by the user via one or more user interface input devices (e.g., based on typed input provided via a physical or virtual keyboard or based on spoken input provided via a microphone). As used herein, free-form input is input that is formulated by a user and that is not constrained to a group of options presented for selection by the user (e.g., not constrained to a group of options presented in a drop-down menu).

As one example, the automated assistant 110 may receive a spoken user utterance in the form of a streaming audio recording. The streaming audio recording may be generated by the client device 106 in response to signals received from a microphone of the client device 106 that captures spoken input of a user of the client device 106. In some implementations, user input may be generated by the client device 106 and/or provided to the automated assistant 110 in response to an explicit invocation of the automated assistant 110 by a user of the client device 106. For example, the invocation may be detection by the client device 106 of certain voice input of the user (e.g., an automated assistant 110 hot word/phrase such as "Hey Assistant"), user interaction with a hardware button and/or virtual button (e.g., a tap of a hardware button, a selection of a graphical interface element displayed by the client device 106), and/or other particular user interface input. When the user input is in the form of a spoken utterance, an automatic speech recognition (ASR) module 113 of input processing engine 112 can convert the spoken utterance to recognized text using a speech recognition model. The input processing engine 112 may optionally standardize or otherwise transform some text. For example, the input processing engine 112 may remove capitalizations, transform dates to a standard format, transform relative temporal terms to a standard format (e.g., transform "tomorrow" to a date that corresponds to "tomorrow"), transform numbers to a generic identifier (e.g., transform any number to "#") etc.

The response and action generation engine 124 directly generates, using neural network model 160, a natural language response and/or an action that is responsive to a received user utterance. The response and action generation engine 124 generates the response and/or action based on processing, using the neural network model: (a) discrete resources from knowledge base 158 and/or search engine 154, along with (b) a received utterance of a user, and any preceding user and/or automated assistant utterances of the current dialog session. For example, the response and action generation engine 124 can generate a dialog encoding based on processing the received user utterance and any preceding utterance of the dialog session using an encoder of the neural network model 160. Also, for example, the response and action generation engine 124 can generate a resource encoding based on processing representations of the resources (along with the dialog history) using the encoder, or based on modifying representations of the resources using probabilities generated using a sparse attention mechanism of the neural network model 160. Additional description of the response and action generation engine 124 and the neural network model 160 is provided herein.

As used herein, a "dialog session" may include a logically-self-contained exchange of one or more messages between a user and automated assistant 110 (and in some cases, other human participants) and/or performance of one or more responsive actions by automated assistant 110. Automated assistant 110 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 110, and so forth.

The output engine 116 generates output based on the natural language responses generated by response and action generation engine 124. For example, the output engine 116 can provide a generated natural language response for graphical rendering at the client device 106 and/or text-to-speech (TTS) module 117 can perform a TTS conversion of the response, and provide corresponding synthesized audio data for audible rendering of the natural language response at the client device 106.

The action engine 118 causes performance of any action generated by response and action generation engine 124. For example, the action engine 118 can identify a given agent, of the agents 140A-N, based on correspondence of the given agent to an intent and/or other parameters specified by the action. Further, the action engine 118 can transmit a corresponding action command to the given agent. In some implementations, the action command can include (or be restricted to) the action as it is generated by the response and action generation engine 124. In some alternative implementations, the action generated by the response and action generation engine 124 can optionally be altered (e.g., for formatting or formalities), and the altered action included in the action command.

Figure 2A:
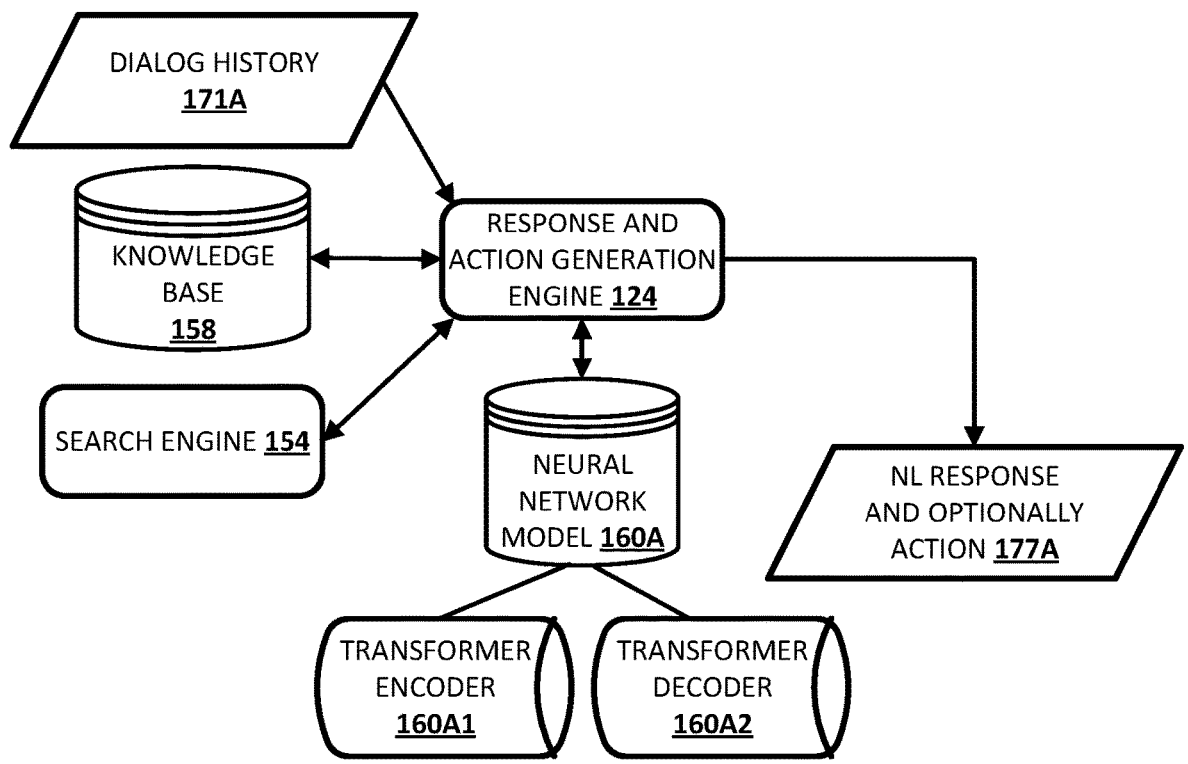
FIG. 2A illustrates an implementation of the neural network model of FIG. 1 and how it can be utilized by the response and action generation engine of FIG. 1 to generate a natural language response and optionally an action.

FIG. 2A illustrates an implementation 160A of the neural network model of FIG. 1 and how it can be utilized by the response and action generation engine 124 of FIG. 1 to generate a natural language response and optionally an action 177A. The response and action generation engine 124 can generate a dialog encoding and resource encoding based on processing the dialog history 171A and electronic resource(s) from knowledge base 158 and/or search engine 154 using a transformer encoder 160A1 of the neural network model 160A. Further, the response and action generation engine 124 can generate the NL response and optionally action 177A, on a token-by-token basis, using the transformer decoder 160A2 attended to both the dialog encoding and resource encoding.

Figure 2B:
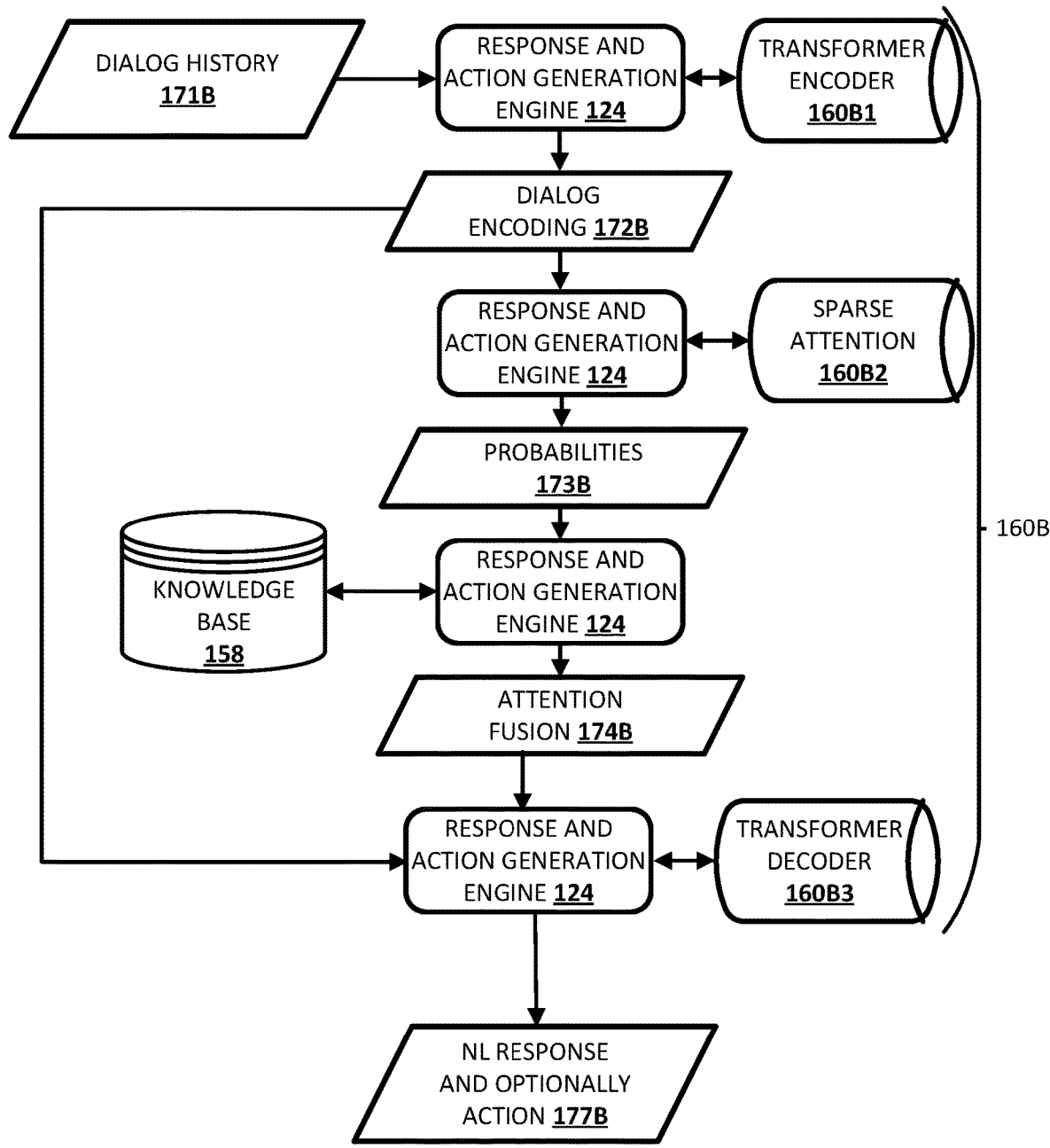
FIG. 2B illustrates another implementation of the neural network model of FIG. 1 and how it can be utilized by the response and action generation engine of FIG. 1 to generate a natural language response and optionally an action.

FIG. 2B illustrates another implementation 160B of the neural network model of FIG. 1 and how it can be utilized by the response and action generation engine 124 of FIG. 1 to generate a natural language response and optionally an action 177B. The implementation 160B of the neural network model of FIG. 2B includes a transformer encoder 160B1, a sparse attention mechanism 160B2, and a transformer decoder 160B3. The response and action generation engine 124 can generate a dialog encoding 172B based on processing the dialog history 171B using the transformer encoder 160B1. Further, the response and action generation engine 124 can generate probabilities 173B for discrete resources of the knowledge base 158 based on processing the dialog encoding 172B using the sparse attention mechanism 160B2, and optionally processing the discrete resources (e.g., representations thereof). Yet further, the response and action generation engine 124 can generate natural language response and optionally action 177B, on a token-by-token basis, using the transformer decoder 160B3 attended to both the dialog encoding 172B and attention fusion 174B. The attention fusion 174B can be a fusion of initial resource representations of the discrete resources, with their corresponding probabilities 173B (thereby representing an encoded representation of the discrete resources).

Figure 3:
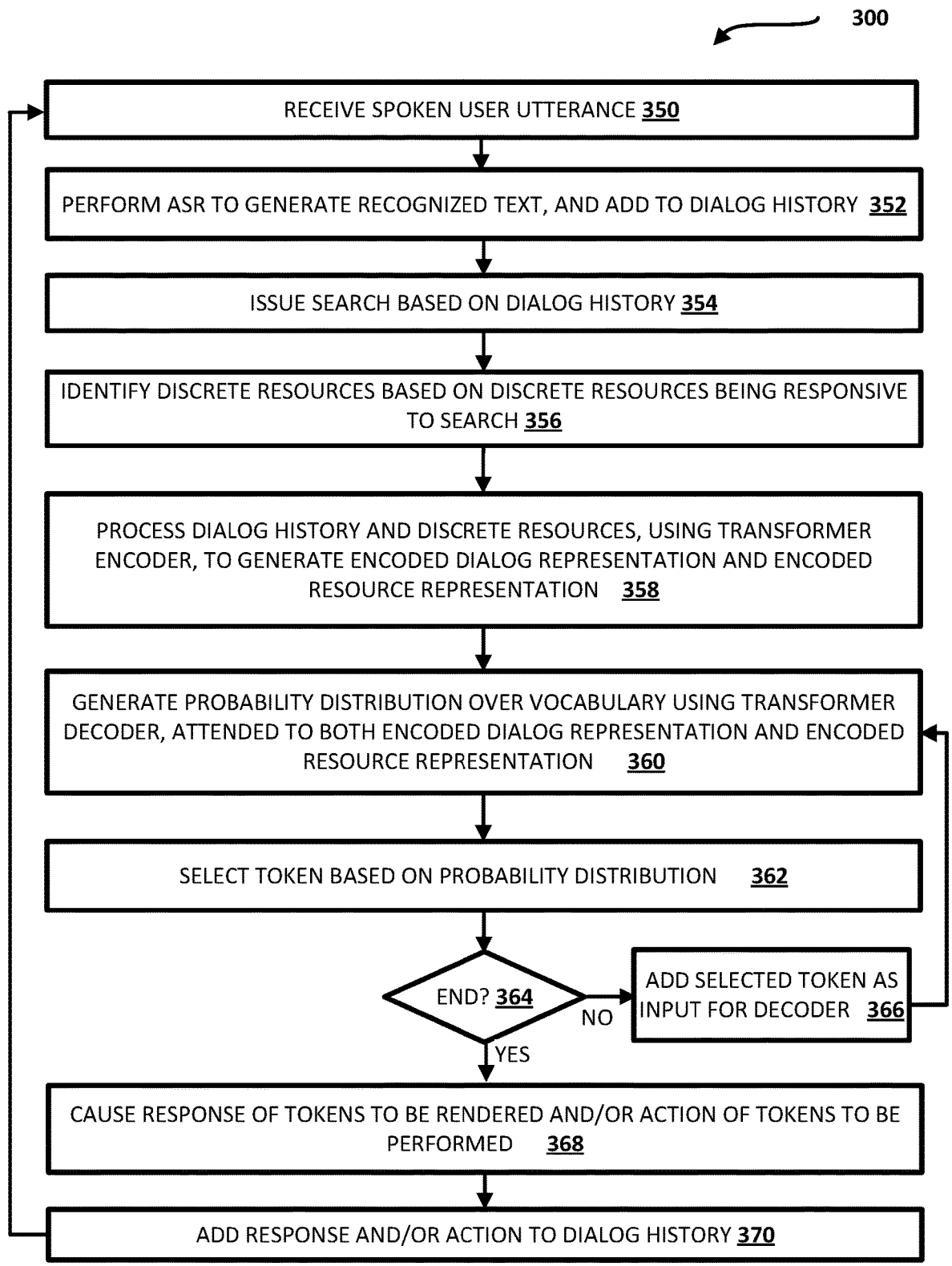
FIG. 3 is a flowchart illustrating an example method of generating a natural language response and optionally an action, directly from dialog history and discrete resources.

FIG. 3 is a flowchart illustrating an example method 300 of generating a natural language response and optionally an action, directly from dialog history and discrete resources. For convenience, the operations of the flow chart of FIG. 3 are described with reference to a system that performs the operations. This system may include various components of various computer systems, such as response and action generation engine 124 of automated assistant 110. Moreover, while operations of method 300 are shown in a particular order, this is not meant to be limiting. One or more operations may be reordered, omitted or added.

At block 350, the system receives a spoken user utterance. For example, the spoken user utterance can be received in the form of audio data generated based on one or more microphones of a client device of the user.

At block 352, they system performs ASR to transform the spoken utterance to recognized text. At block 352, the system also adds the recognized text to dialog history for a current dialog session. Although blocks 350 and 352 are illustrated in method 300, it is understood that in various implementations received user input can be textual input (e.g., via typing), obviating the need for performing ASR at block 352.

At block 354, they system issues a search based on the dialog history for the current dialog session. For example, the system can issue the search based on one or more terms recognized in the most recently received user utterance, and/or based on one or more terms from previous user and/or assistant utterances (if any) that are in the dialog history for the current dialog session. For instance, the system can issue the search based on all terms or certain terms of the user utterance, such as term(s) not classified as stop words. The search can be issued by submitting the term(s) to a search system.

At block 356, the system identifies one or more discrete resources based on the discrete resources being responsive to the search issued at block 354. For example, each discrete resource can be based on all or portions of a corresponding search result, all or portions of a corresponding search result document, and/or a corresponding knowledge graph entry. For instance, the system can identify the title and/or part of the snippet of all or portions of the top ten (or other quantity) search results as the discrete resources (i.e., discrete resource 1 based on search result 1, discrete resource 2 based on search result 2, etc.).

At block 358, the system processes a concatenation of the dialog history and the discrete resources, using a transformer encoder of a neural network, to generate an encoded dialog representation and encoded resource representation. The encoded dialog and resource representations can be a sequence of hidden states after word embedding and multiple self-attention layers.

At block 360, the system generates a probability distribution, over a vocabulary of tokens, using a transformer decoder, of the neural network, that is attended (through multi-head attention) to both the encoded dialog representation and the encoded resource representation. As described herein, in some implementations the system can, for tokens in the dialog history and/or the discrete resource(s), effectively promote the probability of choosing the token. For example, the system can determine its probability as a weighted mixture of the generated probability distribution and the multi-head attention distributions on the input.

At block 362, the system selects, based on the probability distribution, a token from the vocabulary.

At block 364, the system determines whether response and action generation has ended which can be based on, for example, whether the most recent token of block 362 is an "end" token (if so, the decision of block 364 is "yes"). If not, the system adds the most recently selected token as input for the decoder (along with any token(s) selected in previous iteration(s) of block 362), and returns to block 360. This process continues until an end condition is determined at block 364, thereby generating a natural language response and/or action on a token-by-token basis.

When an end condition is determined at block 364, the system proceeds to block 368 and causes a response of the tokens to be rendered (e.g., graphically and/or audibly as synthesized speech) and/or an action of the tokens to be performed.

At block 370, the response and optionally the action (if any) of block 368 are added to the dialog history. The system then proceeds back to block 350 upon receipt of another user utterance. It is noted that some blocks of 368 may result in the end of a dialog session (e.g., if the action is an ending action), in which case block 370 may be skipped, the dialog session considered ended and the dialog session cleared. Method 300 can then be performed responsive to another user utterance being received in a new dialog session. Moreover, even if the end of a dialog session is not determined at block 368, not receiving another user utterance within a threshold amount of time may also lead to the dialog session being considered terminated.

Figure 4:
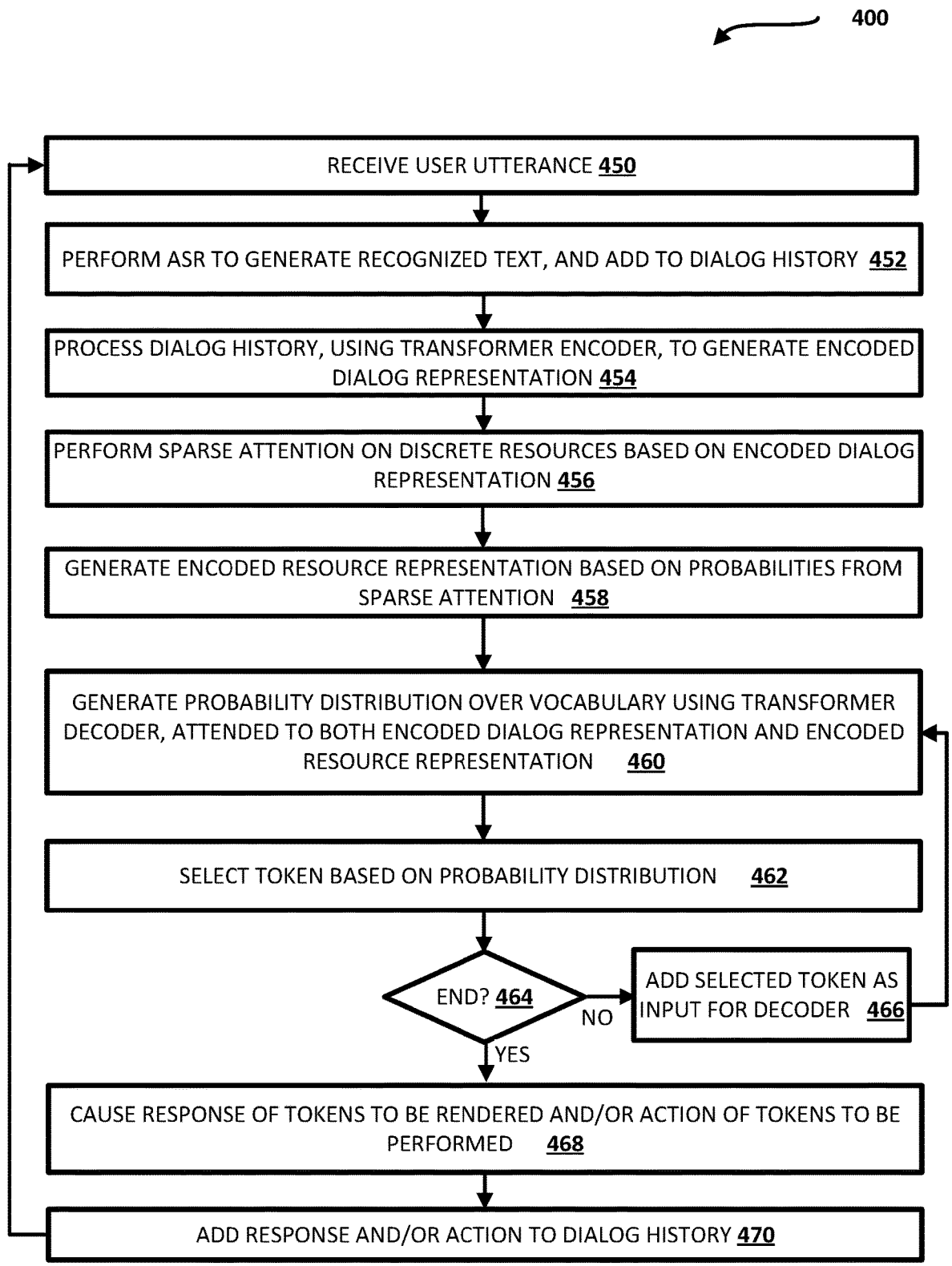
FIG. 4 is another flowchart illustrating an example method of generating a natural language response and optionally an action, directly from dialog history and discrete resources.

FIG. 4 is another flowchart illustrating an example method 400 of generating a natural language response and optionally an action, directly from dialog history and discrete resources. For convenience, the operations of the flow chart of FIG. 43 are described with reference to a system that performs the operations. This system may include various components of various computer systems, such as response and action generation engine 124 of automated assistant 110. Moreover, while operations of method 400 are shown in a particular order, this is not meant to be limiting. One or more operations may be reordered, omitted or added.

At block 450, the system receives a spoken user utterance. For example, the spoken user utterance can be received in the form of audio data generated based on one or more microphones of a client device of the user.

At block 452, they system performs ASR to transform the spoken utterance to recognized text. At block 452, the system also adds the recognized text to dialog history for a current dialog session. Although blocks 450 and 4352 are illustrated in method 400, it is understood that in various implementations received user input can be textual input (e.g., via typing), obviating the need for performing ASR at block 452.

At block 454, the system processes the dialog history, using a transformer encoder, to generate an encoded dialog representation. For example, the encoded dialog representation can be a sequence of hidden states after word embedding and multiple self-attention layers. The dialog history can be processed, using the transformer encoder, without processing of any discrete resources using the transformer encoder.

At block 456, the system performs sparse attention on discrete resources, based on the encoded dialog representation. For example, the system can perform sparse attention, using a trained sparse attention mechanism, and based on an average or other measure of a sequence of hidden states of the dialog representation. The discrete resources can each be, for example, a knowledge graph entry. Initial representations of the discrete resources can optionally be considered in performing the sparse attention. At block 456, the system can generate a corresponding probability (e.g., sigmoid probability) for each of the discrete resources.

At block 458, the system generates an encoded resource representation based on probabilities generated from the sparse attention of block 456. For example, initial representations of the discrete resources can be modified based on their probabilities, and the modified representation utilized as the encoded resource representation. The initial representation of a discrete resource can be, for example, an average of word embeddings for the discrete resource or other representation.

At block 460, the system generates a probability distribution, over a vocabulary of tokens, using a transformer decoder, of the neural network, that is attended (through multi-head attention) to both the encoded dialog representation and the encoded resource representation. As described herein, in some implementations the system can, for tokens in the dialog history and/or the discrete resource(s), effectively promote the probability of choosing the token.

At block 3462, the system selects, based on the probability distribution, a token from the vocabulary.

At block 464, the system determines whether response and action generation has ended which can be based on, for example, whether the most recent token of block 462 is an "end" token (if so, the decision of block 464 is "yes"). If not, the system adds the most recently selected token as input for the decoder (along with any token(s) selected in previous iteration(s) of block 462), and returns to block 4360. This process continues until an end condition is determined at block 464, thereby generating a natural language response and/or action on a token-by-token basis.

When an end condition is determined at block 464, the system proceeds to block 468 and causes a response of the tokens to be rendered (e.g., graphically and/or audibly as synthesized speech) and/or an action of the tokens to be performed.

At block 470, the response and optionally the action (if any) of block 468 are added to the dialog history. The system then proceeds back to block 450 upon receipt of another user utterance. It is noted that some blocks of 468 may result in the end of a dialog session (e.g., if the action is an ending action), in which case block 470 may be skipped, the dialog session considered ended and the dialog session cleared. Method 400 can then be performed responsive to another user utterance being received in a new dialog session. Moreover, even if the end of a dialog session is not determined at block 468, not receiving another user utterance within a threshold amount of time may also lead to the dialog session being considered terminated.

Figure 5:
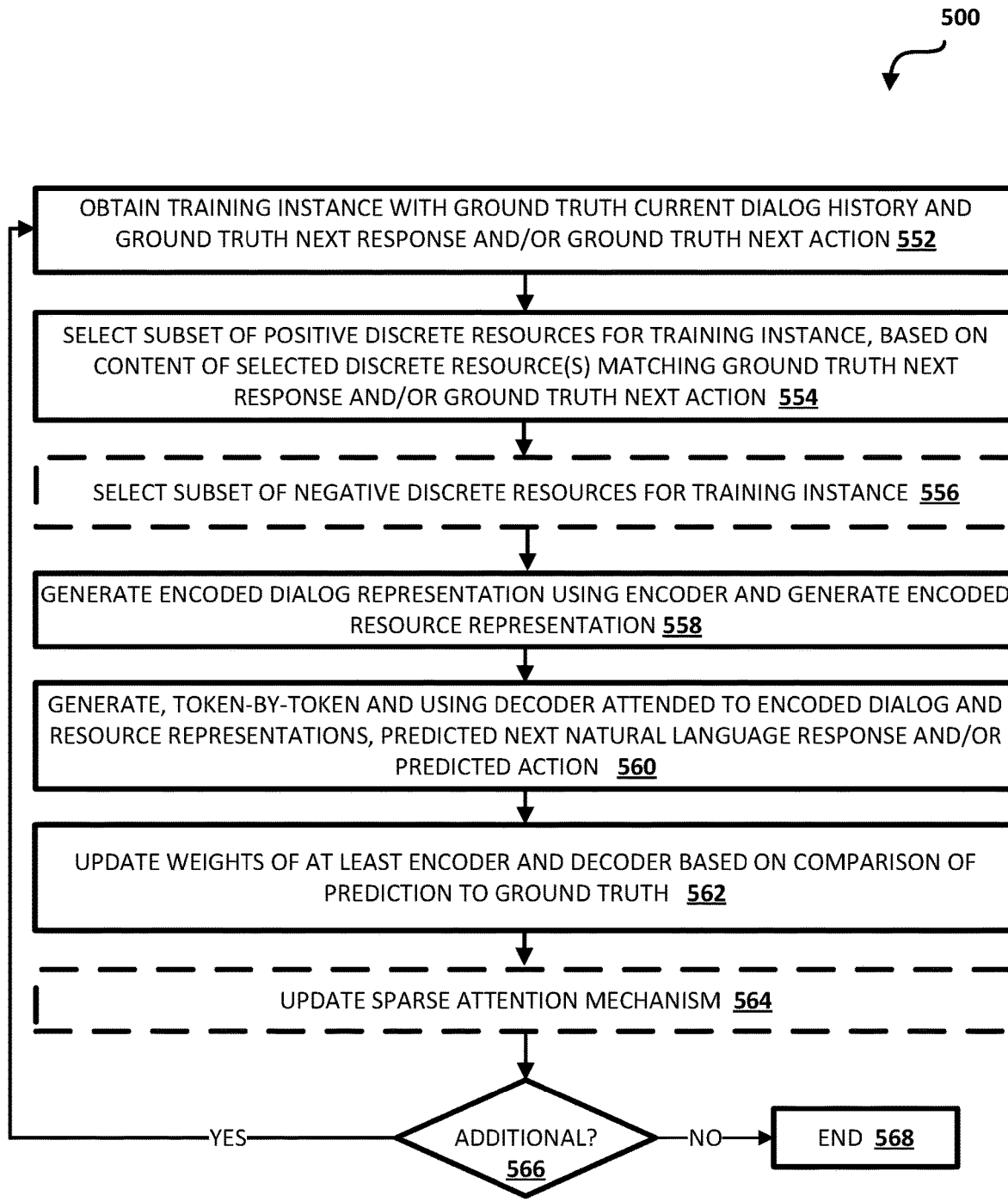
FIG. 5 is a flowchart illustrating an example method of training a single neural network model that can be used to generate a natural language response and optionally an action, directly from dialog history and discrete resources.

FIG. 5 is a flowchart illustrating an example method 500 of training a single neural network model that can be used to generate a natural language response and optionally an action, directly from dialog history and discrete resources. For convenience, the operations of the flow chart of FIG. 5 are described with reference to a system that performs the operations. This system may include various components of various computer systems, such as a plurality of GPUs. Moreover, while operations of method 500 are shown in a particular order, this is not meant to be limiting. One or more operations may be reordered, omitted or added.

At block 552, the system obtains a training instance with a ground truth current dialog history and a ground truth next action.

At block 554, the system selects a subset of positive discrete resources for the training instance. The system selects the subset based on content of the selected discrete resource(s) matching the ground truth next response and/or the ground truth next action of the training instance.

At optional block 556, the system selects a subset of negative discrete resources for the training instance. For example, the system can randomly sample, from the discrete resources not selected at block 554, a quantity of remaining resources and select that quantity as weakly labeled negative discrete resources. In some implementations, block 556 is not performed for the first N iterations of method 500, then is performed for all iterations of the first N iterations. In some implementations (e.g., when training a model for use in method 300), block 556 is omitted.

At block 558, the system generates an encoded dialog representation using an encoder, and generates an encoded resource representation. The system generates the encoded dialog representation by processing the ground truth current dialog history using the encoder. In some implementations (e.g., when training a model for use in method 300), the system generates the encoded resource representation by also processing the selected positive discrete resources, along with the ground truth current dialog history, using the encoder.

At block 560 the system generates, token-by-token and using a decoder attended to the encoded dialog and resource representations of blocks 556 and 558, a predicted next natural language response and/or a predicted action. This can be similar to block 360, 362, 364, and 366 of method 300, and can optionally utilize scheduled sampling as described herein.

At block 562, the system updates weights of at least the encoder and the decoder based on comparison of the predicted natural language response and/or action, to the ground truth natural language response and/or action of the training instance.

At optional block 564, the system updates the sparse attention mechanism (if any is included in the model). In some implementations and/or for some iterations, weights of any sparse attention mechanism of the model can also be updated based on the comparison at block 562. In some of those implementations, the weights for the sparse attention mechanism are not updated for the first N iterations of method 500. In some implementations, weights of the sparse attention mechanism are additionally or alternatively generated based on comparison of the weak labeling of the positive and negative electronic resources to the corresponding probabilities generated using the spare attention mechanism. In some of those implementations, weights of the encoder and/or the decoder can also be generated based on such a comparison.

At block 566, the system determines whether to process an additional training instance. If so, the system proceeds to block 552, obtains an additional training instance, then performs blocks 554, 556, and 558, 560, 562, and 564 based on the additional unprocessed training instance. In some implementations, at block 552 the system may determine not to process any additional unprocessed training instances if one or more training criteria have been satisfied (e.g., a threshold number of epochs have occurred and/or a threshold duration of training has occurred).

If, at block 566, the system determines not to process an additional training instance, the system proceeds to block 568 and training ends. The trained model can then be utilized in either method 300 or method 400 (depending on the construct of the model and the training performed).

Figure 6:
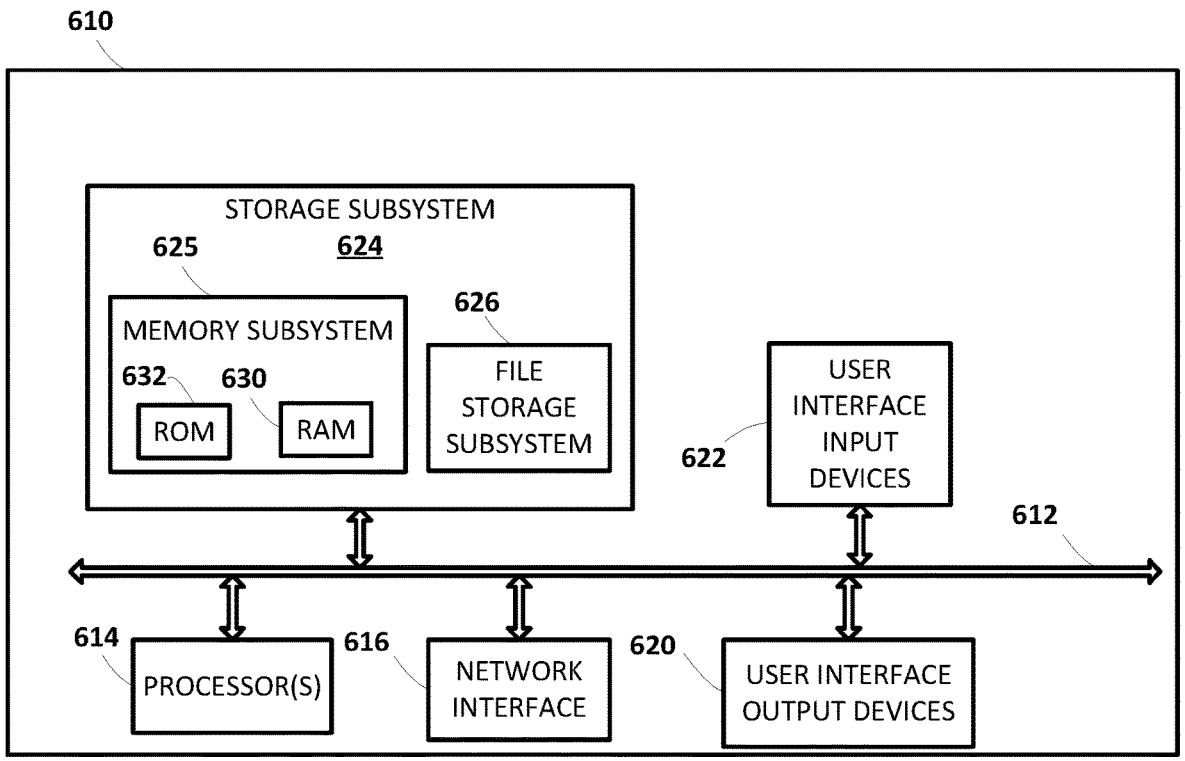
FIG. 6 illustrates an example architecture of a computing device.

FIG. 6 is a block diagram of an example computing device 610 that may optionally be utilized to perform one or more aspects of techniques described herein. In some implementations, one or more of client device 106, automated assistant 110, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods described herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method is provided that includes generating, using an automatic speech recognition component, recognized text from a spoken utterance of a user during a dialog session. The dialog session is between the user and an automated assistant, and the spoken utterance is captured in audio data detected by one or more microphones of a client device. The method further includes adding the spoken utterance to a dialog history of the dialog session. The method further includes generating an encoded dialog representation based on processing the recognized text, and any other text of the dialog history of the dialog session, using a transformer encoder. The method further includes identifying a plurality of discrete resources, and generating an encoded resource representation based on processing the plurality of discrete resources. The method further includes generating a natural language response and/or an action that are responsive to the spoken utterance. Generating the natural language response and/or the action includes generating the natural language response and/or the action, token-by-token, using a transformer decoder attended to both the encoded dialog representation and the encoded resource representation. The method further includes causing the natural language response to be rendered at the client device and/or the action to be performed, as a response by the automated assistant to the spoken utterance.

These and other implementations disclosed herein can include one or more of the following features.

In some implementations, generating the encoded resource representation includes: determining a corresponding probability for each of the plurality of discrete resources based on the encoded dialog representation; and generating the encoded resource representation as a function of corresponding initial representations of the plurality of discrete resources, and the corresponding probabilities. In some version of those implementations, determining the corresponding probability for each of the plurality of discrete resources based on the encoded dialog representation includes using a sparse attention mechanism in determining the corresponding probabilities. In some of those versions, determining the corresponding probability for each of the plurality of discrete resources using the sparse attention mechanism includes processing an average of the encoded dialog representation using the sparse attention mechanism. Generating the encoded resource representation as a function of initial representations of the plurality of discrete resources, and the corresponding probabilities can optionally include: multiplying the initial representations by their corresponding probabilities. The corresponding initial representations can, for example, each be based on corresponding word embeddings for a corresponding one of the discrete resources.

In some implementations, the discrete resources are each corresponding triples from a knowledge graph.

In some implementations, the conversation history of the dialog session further includes one or more prior automated assistant responses in the dialog session and/or one or more prior instances of recognized text from prior user utter utterances in the dialog session.

In some implementations, generating the encoded resource representation based on processing the plurality of discrete resources includes processing the plurality or discrete resources using the transformer encoder along with the recognized text and the any other text of the dialog history.

In some implementations, identifying the plurality of discrete resources includes issuing a search based on the recognized text, and identifying the plurality of discrete resources based on the plurality of discrete resources being responsive to the issued search.

In some implementations, generating the natural language response and/or the action, token-by-token, using the transformer decoder attended to both the encoded dialog representation and the encoded resource representation includes: generating, at each of a plurality of iterations of processing using the transformer decoder, a probability distribution over a vocabulary of tokens; selecting, from the vocabulary of tokens and based on the probability distribution for the iteration, a corresponding token for the iteration; and using the selected token as part of the natural language response and/or the action, and as part of the input to the transformer decoder in an subsequent iteration of the iterations of processing. Some of those implementations further include altering the probability distribution by altering token probabilities for one or more tokens, of the vocabulary, that are also included in the dialog history and/or the discrete resources.

In some implementations, generating the natural language response and/or the action, token-by-token, using the transformer decoder attended to both the encoded dialog representation and the encoded resource representation includes generating a sequence of tokens that includes both the natural language response and the action. Some versions of those implementations include transmitting the action to a remote device to cause performance of the action. The action can, for example, cause a state of a smart device to be altered and the remote device is the smart device, or a remote server controlling the smart device.

In some implementations, a method is provided that includes obtaining, for a training instance: a ground truth current dialog history of a dialog session with an automated assistant, and a ground truth next response and/or ground truth next action for the dialog session. The method further includes selecting, from a set of candidate discrete resources, a subset of positive discrete resources for the training instance. Selecting the subset of positive discrete resources can be based on the discrete resources each including corresponding content that matches the ground truth next response and/or the ground truth next action. The method further includes generating an encoded dialog representation based on processing the dialog history using a transformer encoder. The method further includes generating, token-by-token and using a transformer decoder attended to both the encoded dialog representation and an encoded resource representation based on the subset of positive discrete resources, a predicted next natural language response and/or a predicted next action. The method further includes updating weights of at least the transformer encoder and the transformer decoder based on comparison of the (a) predicted next natural language response and/or a predicted next action to the (b) ground truth next response and/or ground truth next action for the dialog session.

These and other implementations disclosed herein can include one or more of the following features.

In some implementations, the method further includes selecting, from the set of candidate discrete resources not in the subset, a subset of negative discrete resources for the training instance. In those implementations, the encoded resource representation can be further based on processing the subset of negative discrete resources. In some of those implementations, selecting the subset of negative discrete resources for the training instance is responsive to determining that a threshold quantity of training steps have occurred and/or that a threshold duration of training has occurred.

In some implementations, the method further includes determining to refrain from updating any weights of a sparse attention mechanism responsive to determining that a threshold quantity of training steps have not occurred and/or that a threshold duration of training has not occurred.

In some implementations, the method further includes generating the encoded resource representation. Generating the encoded resource representation can include: determining a corresponding predicted probability for each of the positive discrete resources of the subset based on processing the encoded dialog representation using a sparse attention mechanism; determining modified corresponding predicted probabilities for each of the positive discrete resources of the subset as a function of the corresponding predicted probabilities and a positive probability; and generating the encoded resource representation as a function of corresponding initial representations of the positive discrete resources of the subset, and the modified corresponding probabilities. The positive probability can be utilized in generating the modified corresponding predicted probabilities based on the positive discrete resources each including corresponding content that is also included in the ground truth next response and/or the ground truth next action. In some versions of those implementations, a weighting of the positive probability in determining the modified corresponding predicted probabilities is based on a quantity of training steps that have occurred and/or a duration of training that has occurred.

In some implementations, the method further includes generating the encoded resource representation. Generating the encoded resource representation can include: determining a corresponding predicted probability for each of the positive discrete resources of the subset based on processing the encoded dialog representation using a sparse attention mechanism; and generating the encoded resource representation as a function of corresponding initial representations of the positive discrete resources of the subset, and the corresponding probabilities, without modification. In some versions of those implementations, generating the encoded representation as the function of the corresponding initial representations and the corresponding probabilities, without modification, is responsive to determining that a threshold quantity of training steps have occurred and/or that a threshold duration of training has occurred. In some implementations, the method further includes updating weights of the sparse attention mechanism based on comparison of the (a) predicted next natural language response and/or a predicted next action to the (b) ground truth next response and/or ground truth next action for the dialog session. Updating weights of the sparse attention mechanism can optionally be further based on comparison of the corresponding predicted probabilities to the positive probability. Updating weights of the transformer encoder and/or the transformer decoder can optionally be further based on the comparison of the corresponding predicted probabilities to the positive probability.

In some implementations, the discrete resources are each corresponding triples from a knowledge graph.

The invention claimed is:

1. A method implemented by one or more processors, the method comprising:
   generating, using an automatic speech recognition component, recognized text from a spoken utterance of a user during a dialog session between the user and an automated assistant, the spoken utterance captured in audio data detected by one or more microphones of a client device;
   adding the spoken utterance to a dialog history of the dialog session;
   generating an encoded dialog representation based on processing the recognized text, and any other text of the dialog history of the dialog session, using a transformer encoder;
   identifying a plurality of discrete resources;
   generating an encoded resource representation based on processing the plurality of discrete resources;
   generating a natural language response and/or an action that are responsive to the spoken utterance, generating the natural language response and/or the action comprising:
      generating the natural language response and/or the action, token-by-token, using a transformer decoder attended to both the encoded dialog representation and the encoded resource representation; and
   causing the natural language response to be rendered at the client device and/or the action to be performed, as a response by the automated assistant to the spoken utterance.

2. The method of claim 1, wherein generating the encoded resource representation comprises:
   determining a corresponding probability for each of the plurality of discrete resources based on the encoded dialog representation; and
   generating the encoded resource representation as a function of corresponding initial representations of the plurality of discrete resources, and the corresponding probabilities.

3. The method of claim 2, wherein determining the corresponding probability for each of the plurality of discrete resources based on the encoded dialog representation comprises using a sparse attention mechanism in determining the corresponding probabilities.

4. The method of claim 3, wherein determining the corresponding probability for each of the plurality of discrete resources using the sparse attention mechanism comprises:
   processing an average of the encoded dialog representation using the sparse attention mechanism.

5. The method of claim 2, wherein generating the encoded resource representation as a function of initial representations of the plurality of discrete resources, and the corresponding probabilities comprises: multiplying the initial representations by their corresponding probabilities.

6. The method of claim 2, wherein the corresponding initial representations are each based on corresponding word embeddings for a corresponding one of the discrete resources.

7. The method of claim 1, wherein the discrete resources are each corresponding triples from a knowledge graph.

8. The method of claim 1, wherein the dialog history of the dialog session further includes one or more prior automated assistant responses in the dialog session and/or one or more prior instances of recognized text from prior user utter utterances in the dialog session.

9. The method of claim 1, wherein generating the encoded resource representation based on processing the plurality of discrete resources comprises processing the plurality or discrete resources using the transformer encoder along with the recognized text and the any other text of the dialog history.

10. The method of claim 1, wherein identifying the plurality of discrete resources comprises:
    issuing a search based on the recognized text; and
    identifying the plurality of discrete resources based on the plurality of discrete resources being responsive to the issued search.

11. The method of claim 1, wherein generating the natural language response and/or the action, token-by-token, using the transformer decoder attended to both the encoded dialog representation and the encoded resource representation comprises:

generating, at each of a plurality of iterations of processing using the transformer decoder, a probability distribution over a vocabulary of tokens;

selecting, from the vocabulary of tokens and based on the probability distribution for the iteration, a corresponding token for the iteration; and using the selected token as part of the natural language response and/or the action, and as part of the input to the transformer decoder in a subsequent iteration of the iterations of processing.

12. The method of claim 11, further comprising altering the probability distribution by altering token probabilities for one or more tokens, of the vocabulary, that are also included in the dialog history and/or the discrete resources.

13. The method of claim 1, wherein generating the natural language response and/or the action, token-by-token, using the transformer decoder attended to both the encoded dialog representation and the encoded resource representation comprises:

generating a sequence of tokens that includes both the natural language response and the action.

14. The method of claim 13, further comprising:

transmitting the action to a remote device to cause performance of the action.

15. The method of claim 14, wherein the action causes a state of a smart device to be altered and wherein the remote device is the smart device, or a remote server controlling the smart device.

16. A method implemented by one or more processors, the method comprising:

obtaining, for a training instance:

a ground truth current dialog history of a dialog session with an automated assistant, and a ground truth next response and/or ground truth next action for the dialog session;

selecting, from a set of candidate discrete resources, a subset of positive discrete resources for the training instance, selecting the subset of positive discrete resources based on the discrete resources each including corresponding content that matches the ground truth next response and/or the ground truth next action;

generating an encoded dialog representation based on processing the dialog history using a transformer encoder;

generating, token-by-token and using a transformer decoder attended to both the encoded dialog representation and an encoded resource representation based on the subset of positive discrete resources, a predicted next natural language response and/or a predicted next action; and updating weights of at least the transformer encoder and the transformer decoder based on comparison of the (a) predicted next natural language response and/or a predicted next action to the (b) ground truth next response and/or ground truth next action for the dialog session.

17. The method of claim 16, further comprising:

selecting, from the set of candidate discrete resources not in the subset, a subset of negative discrete resources for the training instance;

wherein the encoded resource representation is further based on processing the subset of negative discrete resources.

18. The method of claim 17, wherein selecting the subset of negative discrete resources for the training instance is responsive to determining that a threshold quantity of training steps have occurred and/or that a threshold duration of training has occurred.

19. The method of claim 16, further comprising:

determining to refrain from updating any weights of a sparse attention mechanism responsive to determining that a threshold quantity of training steps have not occurred and/or that a threshold duration of training has not occurred.

20. The method of claim 16, further comprising generating the encoded resource representation, wherein generating the encoded resource representation comprises:

determining a corresponding predicted probability for each of the positive discrete resources of the subset based on processing the encoded dialog representation using a sparse attention mechanism;

determining modified corresponding predicted probabilities for each of the positive discrete resources of the subset as a function of the corresponding predicted probabilities and a positive probability, wherein the positive probability is utilized in generating the modified corresponding predicted probabilities based on the positive discrete resources each including corresponding content that is also included in the ground truth next response and/or the ground truth next action; and generating the encoded resource representation as a function of corresponding initial representations of the positive discrete resources of the subset, and the modified corresponding probabilities.

* * * * *